US011957092B2

United States Patent
Fujihara et al.

(10) Patent No.: US 11,957,092 B2
(45) Date of Patent: Apr. 16, 2024

(54) AGRICULTURAL CONTAINER

(71) Applicant: FUJIFILM Corporation, Tokyo (JP)

(72) Inventors: Yusuke Fujihara, Kanagawa (JP); Akihiro Ikeyama, Kanagawa (JP); Shogo Katano, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 966 days.

(21) Appl. No.: 16/911,839

(22) Filed: Jun. 25, 2020

(65) Prior Publication Data

US 2020/0344958 A1    Nov. 5, 2020

Related U.S. Application Data

(63) Continuation of application No. PCT/JP2018/041125, filed on Nov. 6, 2018.

(30) Foreign Application Priority Data

Dec. 27, 2017    (JP) ................ 2017-251540

(51) Int. Cl.
*A01G 9/02*    (2018.01)
*A01G 9/029*    (2018.01)
*A23B 9/20*    (2006.01)
*B65D 85/52*    (2006.01)

(52) U.S. Cl.
CPC ......... *A01G 9/0293* (2018.02); *A01G 9/0297* (2018.02); *A23B 9/20* (2013.01); *B65D 85/52* (2013.01); *A23V 2002/00* (2013.01)

(58) Field of Classification Search
CPC .. A01G 9/0293; A01G 9/0295; A01G 9/0297; A23B 9/16; A23B 9/18; A23B 9/20; A23V 2002/00; B65D 85/52
See application file for complete search history.

(56) References Cited

U.S. PATENT DOCUMENTS

2013/0174483 A1    7/2013    Caspar et al.
2014/0251858 A1    9/2014    Cardona Jiménez et al.
(Continued)

FOREIGN PATENT DOCUMENTS

EP    1568485 A1 *    8/2005    ......... A41D 31/0061
JP    2002-337954 A    11/2002
JP    2003210049 A *    7/2003
(Continued)

OTHER PUBLICATIONS

Office Action, issued by the Korean Intellectual Property Office dated Nov. 30, 2021, in connection with Korean Patent Application No. 10-2020-7018359.
(Continued)

*Primary Examiner* — Ebony E Evans
(74) *Attorney, Agent, or Firm* — Edwards Neils LLC; Jean C. Edwards, Esq.

(57) ABSTRACT

A packaging bag as an agricultural container has a film which forms a partition separating a housing space which houses agricultural products such as fruits and vegetables from an external space. The packaging bag includes a CA film and a porous film. The CA film contains cellulose acylate having an acyl group substitution degree of 2.00 to 2.97. The porous film is formed such that a plurality of pores having an average pore size of 0.0050 μm to 5.0 μm penetrate the film in a thickness direction.

9 Claims, 5 Drawing Sheets

(56) References Cited

U.S. PATENT DOCUMENTS

2016/0219796 A1* 8/2016 Rodriguez Cabeo .. A01G 9/243
2017/0280637 A1* 10/2017 Katano ...................... C08J 5/18

FOREIGN PATENT DOCUMENTS

| | | |
|---|---|---|
| JP | 2004-290125 A | 10/2004 |
| JP | 2007-106884 A | 4/2007 |
| JP | 2009-072075 A | 4/2009 |
| JP | 2014-534128 A | 12/2014 |
| JP | 2016-185116 A | 10/2016 |
| JP | 2016-185122 A | 10/2016 |
| JP | 2017-079700 A | 5/2017 |
| WO | WO-9315979 A1 * | 8/1993 ............. A47G 7/063 |
| WO | 2015/146673 A1 | 10/2015 |

OTHER PUBLICATIONS

Office Action, issued by the Korean Intellectual Property Office on Jun. 28, 2022, in connection with Korean Patent Application No. 10-2020-7018359.
International Search Report issued in PCT/JP2018/041125 dated Jan. 22, 2019.
Written Opinion issued in PCT/JP2018/041125 dated Jan. 22, 2019.
International Preliminary Report on Patentability issued by WIPO dated Jun. 30, 2020, in connection with International Patent Application No. PCT/JP2018/041125.
Extended European Search Report issued by the European Patent Office on Sep. 25, 2020, in connection with European Patent Application No. 18894078.7.

* cited by examiner

AGRICULTURAL CONTAINER

CROSS-REFERENCE TO RELATED APPLICATIONS

This application is a Continuation of PCT International Application No. PCT/JP2018/041125 filed on Nov. 6, 2018, which was published under PCT Article 21(2) in Japanese, and which claims priority under 35 U.S.C § 119(a) to Japanese Patent Application No. 2017-251540 filed on Dec. 27, 2017. The above applications are hereby expressly incorporated by reference, in their entirety, into the present application.

BACKGROUND OF THE INVENTION

1. Field of the Invention

The present invention relates to an agricultural container.

2. Description of the Related Art

As agricultural containers which house objects to be grown or agricultural products in the agricultural production, for example, seedling raising containers which house seedlings to be grown and packaging containers such as bags or boxes for packing agricultural products such as fruits and vegetables are provided. Modified atmosphere (MA) packaging has been known as packaging for agricultural products, and this packaging adjusts the concentrations of oxygen ($O_2$) and carbon dioxide ($CO_2$) in order to control respiration.

As a packaging container which controls the concentrations of oxygen, carbon dioxide, water vapor, and the like, for example, JP2014-534128A (corresponding to US2014/251858A1) describes a packaging material which is provided with: a container formed of a polymer film; and a gas permeable valve which is fastened to a mouth portion of the container through mechanical connection and permits respiration of fresh products. Polyethylene, polypropylene, polyethylene terephthalate, polyamide, polystyrene copolymer, cellophane, polylactic acid, cellulose acetate, thermoplastic starch and derivatives thereof are described as a material of the polymer film which forms the container. The gas permeable valve is provided with a ring disposed around the mouth portion of the container and an outer peripheral surface of the mouth portion, and a gas permeable lid mechanically connected to the ring. The gas permeable lid has a plurality of perforations, and the perforations in the example in which bananas are packaged are micro-perforations having a diameter of 200 µm or 250 to 300 µm.

JP2004-290125A describes a garlic package formed of a film consisting of a synthetic resin film or a semisynthetic resin film. In the film, pores having an opening area of $3.1 \times 10^{-11}$ to $7.1 \times 10^{-8}$ $m^2$ are formed, the opening area per 100 g of garlic is $1.96 \times 10^{-9}$ to $5.59 \times 10^{-8}$ $m^2/100$ g, the oxygen concentration and the carbon dioxide concentration in the garlic package are within a predetermined range, respectively, and the oxygen transmission rate, the carbon dioxide transmission rate, and the rate of the carbon dioxide transmission rate to the oxygen transmission rate are within a predetermined range.

JP2009-072075A describes a closed plant cultivation system which can prevent invasion of bacteria. In this plant cultivation system, an internal space which houses a plant such as a seedling is formed by a nonporous hydrophilic film. A part of the nonporous hydrophilic film on the external space side is brought into contact with water or a solution disposed in the external space.

SUMMARY OF THE INVENTION

Regarding the storage in an agricultural container, it is preferable to adjust the concentration of a gas such as carbon dioxide and also to suppress condensation from the viewpoint of controlling respiration. This is because the suppression of condensation is effective for suppressing the fogging of an inner surface of the agricultural container or the generation and/or growth of mold in the agricultural container.

In this regard, JP2014-534128A describes that the concentration of water vapor can be controlled. However, in a case where fruits and vegetables which release a larger amount of moisture than bananas described as an object to be housed in JP2014-534128A are packaged, and/or refrigerated for a long period of time, condensation still occurs. In a case where fruits and vegetables which release a large amount of moisture are packaged and/or refrigerated for a long period of time, condensation also occurs in a packaging bag formed of the package of JP2004-290125A. Moreover, in the cultivation system of JP2009-072075A, condensation may also occur on an inner surface of the nonporous hydrophilic film.

Therefore, an object of the present invention is to provide an agricultural container in which the concentration of a gas acting on respiration is adjusted and a condensation suppression effect is further improved.

In order to solve the problems, an agricultural container according to an embodiment of the present invention comprises a cellulose acylate film and a porous film, and has a film which forms at least a part of a partition separating a housing space which houses an object to be housed from an external space. The cellulose acylate film contains cellulose acylate having an acyl group substitution degree of 2.00 to 2.97. In the porous film, a plurality of pores having an average pore size of 0.0050 µm to 5.0 µm are formed to penetrate the film in a thickness direction.

The cellulose acylate preferably has an acetyl group.

An area ratio of the cellulose acylate film is preferably at least 10.0%. An area ratio of the porous film is preferably within a range of 0.1% to 20.0%.

In the porous film, the plurality of pores preferably communicate with each other in the thickness direction.

It is preferable that the object to be housed is a bed and a seedling, and the porous film is disposed on a side surface in an erect posture with respect to the bed. The porous film is preferably disposed on each of first and second side surfaces facing each other. The cellulose acylate film is preferably disposed in a top surface.

The agricultural container is preferably a bag having an opening through which the object to be housed is put into the bag.

According to the present invention, the gas concentration is adjusted, and condensation is further suppressed.

DESCRIPTION OF THE PREFERRED EMBODIMENTS

Figure 1:
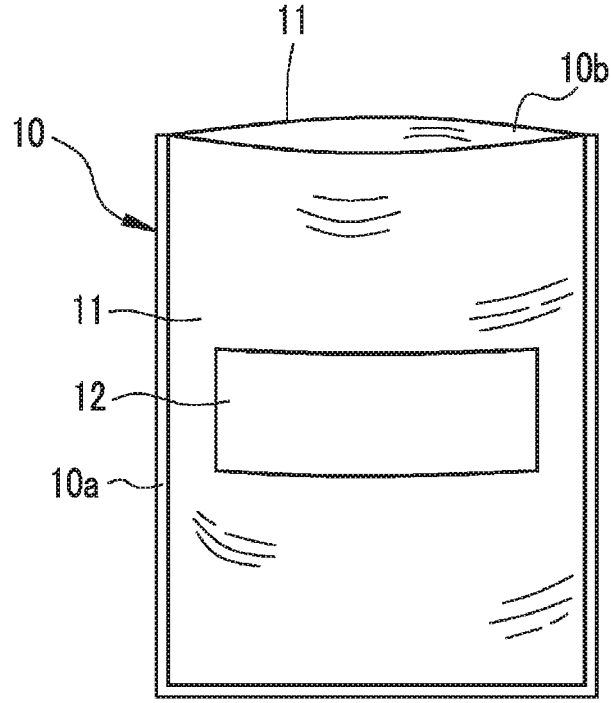
FIG. 1 is a view illustrating a packaging bag according to an embodiment of the present invention.

In FIG. 1, a packaging bag 10 as an example of an agricultural container is a bag-shaped packaging container for packaging agricultural products such as fruits and vegetables. The agricultural products are stored and/or distributed in a state of being housed in a housing space inside the packaging bag 10. In this embodiment, the agricultural products are, for example, fruits and vegetables. The packaging bag 10 is not limited to a product for packaging agricultural products, but can also be used for agricultural production. For example, the packaging bag 10 can be used for covering (covering) seedlings to be grown.

The packaging bag 10 is formed such that three sides of one of two rectangular sheets which are sheet-like films are bonded to three sides of the other sheet. The portion where the two sheets are bonded, that is, the bonding portion is denoted by reference 10*a*. In FIG. 1, an upper opening 10*b* formed by one side which is not bonded is an entrance for fruits and vegetables to be housed, and is sealed by, for example, a pressure sensitive adhesive tape during storage and/or distribution of the fruits and vegetables. Accordingly, the housing space is sealed, and closed packaging is provided.

The packaging bag 10 can be used in both closed packaging and open packaging. Packaging by closed packaging is preferable since contamination due to viruses, bacteria, fungi (including mold), and/or dust is suppressed.

In this example, the two sheets are bonded by heat sealing. However, the bonding method is not limited to heat sealing, and may be, for example, adhesion by a pressure sensitive adhesive tape. The packaging bag 10 is formed by bonding two sheets, but the packaging bag is not limited to this aspect. For example, a packaging bag having a bonding portion and a bent portion may be formed by folding a single rectangular sheet at, for example, a center thereof and bonding two sides.

The packaging bag 10 is an agricultural container which is already formed into a bag shape before use. It may also be an agricultural container which is formed into a bag shape at the time of packaging, that is, at the start of use. Examples of such an example include an agricultural container formed into a cylindrical shape, in which at least a part thereof is formed of a film. An object to be housed is inserted into a hollow portion, and then the opening at an end portion of the cylinder is bonded to form a bag shape.

One bonded sheet (hereinafter, referred to as a first sheet) is formed of a cellulose acylate film (hereinafter, referred to as a CA film) 11 and a porous film 12, and the other sheet (hereinafter, referred to as a second sheet) is formed of a CA film 11. In FIG. 1, the front side is drawn as a first sheet, and the back side is drawn as a second sheet. The packaging bag 10 is provided with the CA film 11 and the porous film 12, and the whole packaging bag is formed of a film. In this example, the bonding portion 10*a* is formed of the CA film 11. Both the first sheet and the second sheet may be formed of the CA film 11 and the porous film 12.

In the first sheet, the porous film 12 is disposed substantially at the center surrounded by the CA film 11. The position of the porous film 12 is not limited to this example, and may be any of an end portion closer to the bonding portion 10*a*, a position closer to the opening 10*b*, or the like. The porous film 12 has a rectangular shape whose long side is the horizontal direction in FIG. 1. However, the shape of the porous film 12 is not limited to this example. Examples of the shape include polygonal shapes such as a square, a triangle, and a pentagon, circular shapes such as a true circle and an ellipse, irregular shapes, and slit shapes extending in one direction. In this example, the CA film 11 and the porous film 12 are bonded by heat sealing such that the outer periphery of the porous film overlaps the CA film. Since the overlapping region is small, it is not shown in FIG. 1.

Hereinafter, each of the CA film 11 and the porous film 12 will be described. The CA film 11 is formed of cellulose acylate. Cellulose acylate has an acyl group since a hydroxy group of cellulose is esterified with a carboxylic acid. The CA film 11 contains (contains) cellulose acylate, and the acyl group substitution degree of the cellulose acylate contained in the packaging bag 10 is within a range of 2.00 to 2.97.

In a case where fruits and vegetables are housed, moisture is released from the fruits and vegetables, and the humidity in the housing space, which is a space inside the packaging bag 10, increases due to the moisture. Due to the increase in humidity, the equilibrium moisture content of the CA film 11 increases. Due to the increase in equilibrium moisture content, the CA film 11 absorbs the moisture. Since the CA film 11 absorbs the moisture, the humidity in the packaging bag 10 is reduced, and thus the equilibrium moisture content of the CA film 11 is reduced and the moisture is released. Since the CA film 11 contains cellulose acylate whose acyl group substitution degree is within the above range, the CA film has such an equilibrium moisture content as to have appropriate moisture absorption and release properties. Accordingly, even in a case where fruits and vegetables are packaged in a sealed state, the packaging bag 10 suppresses the occurrence of condensation of an inner surface which is a surface on the inner side of the packaging bag 10 in a state in which the housing space is maintained at such an appropriately high humidity level that drying of the fruits and vegetables is suppressed. Furthermore, even in a case where the (external) temperature and/or humidity of an external space change, the change in humidity inside the packaging bag 10 is kept smaller than the external change. Moreover, the effect of suppressing the occurrence of condensation is obtained even during refrigerated storage, and is continued for a long period of time, e.g., 14 days. As a result, the generation and growth of mold or the like are suppressed, and the fruits and vegetables are stored in a fresh state for a long period of time. In addition, discoloration of the fruits and vegetables is also suppressed since the fruits and vegetables are in an environment maintained at an appropriately high humidity and condensation is suppressed as described above. Condensation is also suppressed by the CA film 11 in a case where the packaging bag 10 is used for raising seedlings, and as a result, the seedlings are grown well. Since the strength of the CA film 11 is maintained even in a high humidity environment, the fruits and vegetables are protected even in a case where the packaging bag 10 is placed at a high humidity. In raising the seedlings, the seedlings can also be grown for a long period of time.

The lower the acyl group substitution degree, the larger the amount of moisture absorbed by the CA film 11, so that the packaging bag 10 is likely to deform by water absorption. Therefore, the acyl group substitution degree of the cellulose acylate which forms the CA film is adjusted to 2.00 or higher. In theory, the upper limit of the acyl group substitution degree is 3.00. However, cellulose acylate having an acyl group substitution degree which is higher than 2.97 is not easily synthesized. Accordingly, the acyl group substitution degree of the cellulose acylate which forms the packaging bag 10 is adjusted to 2.97 or lower.

The acyl group substitution degree of the cellulose acylate contained in the CA film 11 is more preferably within a range of 2.40 to 2.95, and even more preferably within a range of 2.70 to 2.95. As is well known, the acyl group substitution degree is a rate of esterification of the hydroxy group of cellulose with a carboxylic acid, that is, the degree of substitution of an acyl group.

The acyl group of the cellulose acylate is not particularly limited, and may be an acetyl group having 1 carbon atom, or an acyl group having 2 or more carbon atoms. The acyl group having 2 or more carbon atoms may be an aliphatic group or an aryl group, and examples thereof include an alkylcarbonyl ester, an alkenylcarbonyl ester, an aromatic carbonyl ester, or an aromatic alkylcarbonyl ester of cellulose, and each of them may further have a substituted group. Examples thereof include a propionyl group, a butanoyl group, a pentanoyl group, a hexanoyl group, an octanoyl group, a decanoyl group, a dodecanoyl group, a tridecanoyl group, a tetradecanoyl group, a hexadecanoyl group, an octadecanoyl group, an iso-butanoyl group, a t-butanoyl group, a cyclohexanecarbonyl group, an oleoyl group, a benzoyl group, a naphthylcarbonyl group, and a cinnamoyl group. As the cellulose acylate, commercially available cellulose acylate can be used. Specific examples thereof include cellulose acetate propionate CAP-482-20 (manufactured by Eastman Chemical Japan Ltd.) and cellulose acetate butyrate CAB-381-20 (manufactured by Eastman Chemical Japan Ltd.).

The cellulose acylate may have only one kind of acyl group or two or more kinds of acyl groups, and at least one kind is preferably an acetyl group. In a case where the cellulose acylate has an acetyl group, the moisture is easily absorbed, and thus the effect of suppressing condensation is improved. Most preferable is cellulose acylate in which all acyl groups are acetyl groups. That is, the cellulose acylate is most preferably cellulose acetate.

The acyl group substitution degree can be obtained by a conventional method. For example, an acetylation degree (acetyl group substitution degree) is obtained through measurement and calculation of an acetylation degree according to ASTM: D-817-91 (method of testing cellulose acetate, etc.) which is a standard of ASTM International (former name: American Society for Testing and Materials). In addition, a distribution of an acylation degree (acyl group substitution degree) can be measured by high-performance liquid chromatography. As an example of this method, in the measurement of an acetylation degree of cellulose acetate, a sample is dissolved in methylene chloride (also referred to as dichloromethane), and using a column Nova-Pak (registered trademark) phenyl (manufactured by Waters Corporation), a distribution of an acetylation degree is measured by a linear gradient from a mixed liquid (mass ratio of methanol:water is 8:1) of methanol and water which is an eluant to a mixed liquid (mass ratio of dichloromethane:methanol is 9:1) of dichloromethane and methanol, and compared with a calibration curve obtained from a standard sample having a different acetylation degree. These measurement methods can be obtained with reference to methods described in JP2003-201301A. In a case where the CA film 11 contains (contains) an additive, the acetylation degree of cellulose acylate is preferably measured by high-performance liquid chromatography.

In this embodiment, the CA film 11 is formed by a known solution film forming method, and a plasticizer is preferably added to cellulose acylate having an acyl group substitution degree within the above range in order to form the CA film 11. Various known plasticizers can be used as the plasticizer for the cellulose acylate. Even in a case where a plasticizer is used, condensation is suppressed, and discoloration of fruits and vegetables is also reliably suppressed. For example, in a case where a CA film 11 containing triphenyl acetate (TPP) and biphenyl diphenyl phosphate (BDP) together with cellulose acylate having an acyl group substitution degree within the above range is formed, and fruits and vegetables are put into a packaging bag 10 formed using the above CA film, sealed, and refrigerated for 14 days while being kept at 5° C., only slight condensation is confirmed on an internal wall of the packaging bag, and thus it is confirmed that condensation is suppressed. In addition, it is confirmed that the fruits and vegetables are hardly discolored, and the fresh state is maintained during the storage. Various plasticizers are used from the viewpoint of suppressing condensation. In view of the fact that the objects to be stored are fruits and vegetables, various known plasticizers may be used as long as the safety is confirmed.

The CA film 11 may contain (contain) at least one of an ester derivative of sugar, an ester oligomer, or an acrylic polymer in addition to the cellulose acylate having an acyl group substitution degree within the above range. The ester derivative of sugar and the ester oligomer function as a plasticizer of the cellulose acylate having an acyl group substitution degree within the above range.

The ester derivative of sugar may be either an ester derivative of a monosaccharide or an ester derivative of a polysaccharide, and the CA film 11 may contain both of them. In consideration of the above-described safety, examples of the sugar include monosaccharides such as glucose, galactose, mannose, fructose, xylose and arabinose, and polysaccharides such as lactose, sucrose, nystose, 1F-fructosyl nystose, stachyose, maltitol, lactitol, lactulose, cellobiose, maltose, cellotriose, maltotriose, raffinose or kestose, gentiobiose, gentiotriose, gentiotetraose, xylotriose, and galactosyl sucrose. Glucose, fructose, sucrose, kestose, nystose, 1F-fructosyl nystose, stachyose and the like are preferable, and sucrose and glucose are more preferable. Oligosaccharides can also be used as polysaccharides, and are manufactured by allowing enzymes such as amylase to act on starch, sucrose, or the like. Examples of the oligosaccharides include maltooligosaccharide, isomalto-oligosaccharide, fructo-oligosaccharide, galacto-oligosaccharide, and xylo-oligosaccharide.

The monocarboxylic acid which is used for esterifying all or a part of the OH groups in the monosaccharide or polysaccharide structure is not particularly limited, and known aliphatic monocarboxylic acids, alicyclic monocarboxylic acids, aromatic monocarboxylic acids, and the like can be used. As a carboxylic acid to be used, one kind of carboxylic acid or a mixture of two or more kinds may be used.

Preferable examples of the aliphatic monocarboxylic acids include saturated fatty acids such as an acetic acid, a propionic acid, a butyric acid, an isobutyric acid, a valeric acid, a caproic acid, an enanthic acid, a caprylic acid, a pelargonic acid, a capric acid, a 2-ethyl-hexane carboxylic acid, an undecyl acid, a lauric acid, a tridecylic acid, a myristic acid, a pentadecylic acid, a palmitic acid, a heptadecylic acid, a stearic acid, a nonadecanoic acid, an arachic acid, a behenic acid, a lignoceric acid, a cerotic acid, a heptacosanoic acid, a montanic acid, a melissic acid, and a lacceric acid, unsaturated fatty acids such as an undecylenic acid, an oleic acid, a sorbic acid, a linoleic acid, a linolenic acid, an arachidonic acid, and an octenoic acid, and alicyclic monocarboxylic acids such as a cyclopentanecarboxylic acid, a cyclohexanecarboxylic acid, and a cyclooctanecarboxylic acid.

Preferable examples of the aromatic monocarboxylic acids include aromatic monocarboxylic acids such as a benzoic acid and a toluic acid in which an alkyl group or an alkoxy group is introduced to a benzene ring of a benzoic acid, aromatic monocarboxylic acids such as a cinnamic acid, a benzilic acid, a biphenylcarboxylic acid, a naphthalenecarboxylic acid, and a tetralincarboxylic acid which have two or more benzene rings, and derivatives thereof, and a benzoic acid and a naphthalene carboxylic acid are particularly preferable.

The ester oligomer is a compound having a repeating unit containing an ester bond of a dicarboxylic acid and a diol, and having such a relatively low molecular weight that about several to 100 repeating units are contained, and is preferably an aliphatic ester oligomer. This is because the cellulose acylate acts as a plasticizer more reliably than an aromatic ester oligomer.

The ester oligomer preferably has a molecular weight of 500 to 10,000. The reason for this is that in a case where the molecular weight is 500 or greater, the flexibility (flexibility) and/or heat sealability of the CA film 11 are improved as compared to a case where the molecular weight is less than 500, and in a case where the molecular weight is 10,000 or less, the compatibility with the cellulose acylate is reliable as compared to a case where the molecular weight is greater than 10,000. The molecular weight of the ester oligomer is more preferably within a range of 700 to 5,000, and even more preferably within a range of 900 to 3,000.

The molecular weight of the ester oligomer has a molecular weight distribution, and thus it can be obtained by the weight-average molecular weight and/or number-average molecular weight obtained by gel permeation chromatography (GPC), the number-average molecular weight measurement method using terminal functional group amount measurement and/or osmotic pressure measurement, the viscosity-average molecular weight obtained by viscosity measurement, or the like. In this embodiment, the number-average molecular weight measurement method using measurement of a hydroxyl group or an acid group of an ester as a terminal functional group is used.

In the ester oligomer, the dicarboxylic acid preferably has 2 to 10 carbon atoms, and the diol preferably has 2 to 10 carbon atoms. Particularly, both of the dicarboxylic acid and the diol are preferably aliphatic compounds. The reason for this is that using an aliphatic dicarboxylic acid and an aliphatic diol, flexibility can be imparted to the CA film 11, and the moisture content is enhanced. In this embodiment, the moisture content is obtained as follows: a measurement object is humidity-controlled for 24 hours at 25° C. and a relative humidity of 80% or 55%, and then a 500 mg sample is sampled and the moisture content of the sampled sample is obtained by a Karl Fischer moisture meter (AQ-2200) manufactured by HIRANUMA SANGYO Co., Ltd. Examples of the dicarboxylic acid include aromatic carboxylic acids such as a phthalic acid, a terephthalic acid, and an isophthalic acid, and aliphatic carboxylic acids such as a malonic acid, a succinic acid, a glutaric acid, an adipic acid, a sebacic acid, an azelaic acid, a cyclohexanedicarboxylic acid, a maleic acid, and a fumaric acid. Examples of the aliphatic diol include ethanediol, 1,2-propanediol, 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 1,4-hexanediol, 1,4-cyclohexanediol, and 1,4-cyclohexanedimethanol. It is also preferable that the terminal hydroxyl group and/or acid group of the ester oligomer be sealed with a monocarboxylic acid or a monoalcohol. Among these, an oligomer having an ester of an adipic acid and an ethylene glycol as a repeating unit, an oligomer having an ester of a succinic acid and an ethylene glycol as a repeating unit, and an oligomer having an ester of a terephthalic acid and an ethylene glycol and an ester of a phthalic acid and an ethylene glycol as a repeating unit are preferable.

The mass of an ester derivative of a monosaccharide is represented by M1, the mass of an ester derivative of a polysaccharide is represented by M2, the mass of an ester oligomer is represented by M3, and the sum of masses (hereinafter, referred to as mass sum) obtained by M1+M2+M3 is represented by MP. In a case where the CA film 11 contains at least one of an ester derivative of a monosaccharide, an ester derivative of a polysaccharide, or an ester oligomer, the mass sum MP is preferably within a range of 5 to 30 under the assumption that the mass of the cellulose acylate is 100. In a case where the mass sum MP is 5 or greater, the CA film 11 has better flexibility and/or is more easily formed than in a case where the mass sum MP is less than 5. In a case where the mass sum MP is 30 or less, the CA film 11 has a more preferable moisture content than in a case where the mass sum MP is greater than 30.

The CA film 11 may contain (contain), as an additive, an ultraviolet absorber or fine particles serving as a so-called matting agent for preventing adhesion between CA films 11, in addition to the plasticizer, as long as these are confirmed to be safe as described above. By adjusting the type and the amount of the additive, the moisture content of the CA film 11 can be adjusted, and as a result, the humidity in the packaging bag 10 is adjusted while the fruits and vegetables are housed. Accordingly, in addition to condensation, drying of the fruits and vegetables is also suppressed.

The acrylic polymer (acrylic resin) functions as an adjuster for the moisture content and/or flexibility of the CA film 11. As the acrylic polymer, for example, methyl acrylate, methyl methacrylate, and copolymers thereof with an acrylic acid or a methacrylic acid are preferable. In a case where the CA film 11 contains an acrylic polymer, the mass of the acrylic polymer is preferably within a range of 10 to 300 under the assumption that the mass of the cellulose acylate is 100.

The safety of esters of sugars, ester oligomers, and acrylic polymers are described in the following literatures. That is, regarding esters of sugars, descriptions are provided in Journal of Synthetic Organic Chemistry, Vol. 21(1963) No. 1, pages 19 to 27, catalog of Dai-ichi Kogyo Seiyaku Co., Ltd., JP2011-237764A, and the like. In the catalog of Dai-ichi Kogyo Seiyaku Co., Ltd., fatty acid esters and benzoic acid esters of sugars are described. Regarding ester oligomers, descriptions including suppression of movement of an ester oligomer, as an additive for vinyl chloride, to the vinyl chloride are provided on the website of the Vinyl Environmental Council, documents of the Japan Plasticizer Industry Association, and the like. In addition, descriptions including blending with cellulose triacetate are provided in JP2009-173740A. Regarding acrylic polymers, descriptions are provided in JP2003-012859A and JP2011-154360A. The safety includes not only the safety of the substances itself described above, but also the safety of the decomposition products of the substances.

The thickness of the CA film 11 is preferably within a range of 15 µm to 300 µm. The moisture content of the CA film 11 can be adjusted by adjusting the thickness, and as a result, the internal humidity of the packaging bag 10 is adjusted while fruits and vegetables are housed. Thus, condensation is suppressed and drying of the fruits and vegetables is also suppressed. Also, condensation is similarly suppressed in a case where the packaging bag is used for raising seedlings. By increasing the thickness, the CA film can also be used for a packaging bag having a larger size. The thickness of the CA film 11 is more preferably within a range of 20 µm to 200 µm, and even more preferably within a range of 30 µm to 120 µm.

Fruits and vegetables maintain physiological actions such as water release and/or respiratory actions. Therefore, regarding the fruits and vegetables, condensation is remarkably suppressed in a case where the packaging bag 10 is used, and the effect of suppressing drying of an object to be housed is also remarkably exhibited. Examples of such fruits and vegetables include flower vegetables such as broccoli and nabana, leafy vegetables such as spinach and komatsuna, stalk vegetables such as garlic and asparagus, fruit vegetables such as bell pepper, eggplant, tomato, cucumber, strawberry, and edamame, fruits such as banana, grape, apple, pear, and mandarin, root vegetables such as Chinese yam and burdock, mushrooms such as shiitake mushroom and shimeji mushroom, and cut flowers such as *chrysanthemum* and lily. Among these, flower vegetables, leafy vegetables, fruit vegetables, mushrooms, and cut flowers are particularly preferably packaged using the packaging bag 10 since the above fruits and vegetables release a particularly large amount of moisture, and thus condensation is shown during long-term storage and distribution in refrigeration. The above-described classification of fruits and vegetables is based on the Japanese Standard Commodity Classification.

With the CA film 11, the packaging bag 10 suppresses condensation and discoloration during storage of fruits and vegetables at room temperature, and prevents condensation and discoloration even during refrigeration and can store the fruits and vegetables for a long period of time. Since condensation is suppressed, mold or the like is also suppressed. Room temperature storage refers to storage within a range of higher than 10° C. to 30° C., and refrigerated storage refers to storage within a range of 0° C. to 10° C.

In order to maintain the freshness of the fruits and vegetables, refrigerated storage is preferably performed. Since the CA film 11 absorbs and releases moisture according to the change in humidity of the housing space by the equilibrium moisture content of the CA film 11, it prevents condensation and maintains the humidity so as to suppress drying of the fruits and vegetables.

Figure 2:
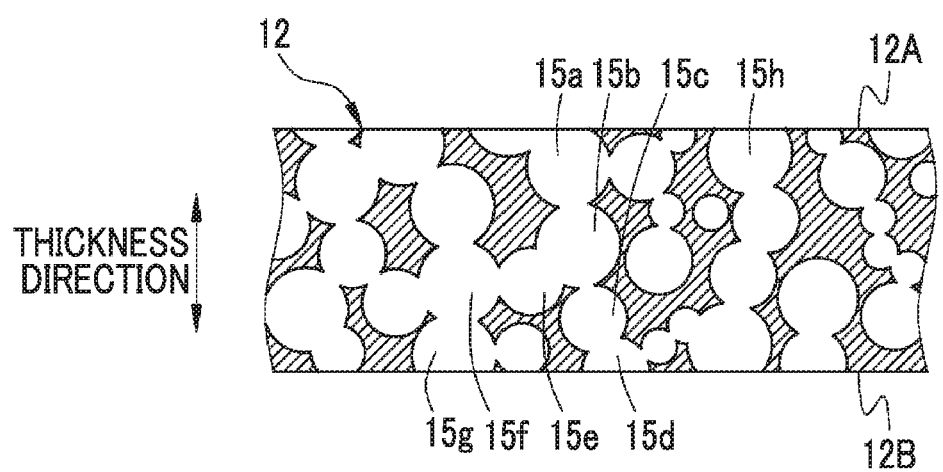
FIG. 2 is a view illustrating a cross-section of a porous film.

As shown in FIG. 2, the porous film 12 has a plurality of pores 15a, 15b, . . . , 15g, and 15h. In the following description, the pores 15a, 15b, . . . , 15g, and 15h are referred to as pores 15 in a case where there is no need to distinguish them. The plurality of pores 15 formed have an average pore size of 0.0050 µm to 5.0 µm. The average pore size is more preferably 0.0010 µm to 4.5 µm, and even more preferably 0.0020 µm to 2.0 µm. The average pore size can be obtained by an average pore size measured by a perm-porometer manufactured by POROUS MATERIALS (USA), a nominal pore size shown in Japanese Industrial Standard JIS K3802 1029 (for example, a pore size at which 95% of the particles can be removed using a standard latex having a uniform particle size), or the like. In this example, among the above examples, a perm-porometer is used to obtain the average pore size. In a case where a commercially available product is used as the porous film 12, a catalog value may be used.

The plurality of pores 15a to 15d are formed to penetrate the porous film 12 in a thickness direction thereof, and communicate with each other in the thickness direction. In a case where the pores 15 having an average pore size within the above range are formed to penetrate the film in the thickness direction, carbon dioxide and oxygen pass through the pores 15 and gas exchange is performed. Therefore, for example, excessive concentration of carbon dioxide is suppressed inside the packaging bag 10, and thus respiration of fruits and vegetables is controlled or discoloration is suppressed. Similarly, the gas acting on the respiration of seedlings is exchanged through the porous film 12 in a case where the packaging bag is used for raising seedlings, and thus the seedlings are grown well. The porous film formed such that the pores 15 having an average pore size within the above range penetrate the film in the thickness direction can be formed by, for example, a phase separation method. The porous film can also be formed by a method of heat-sealing nonwoven fabric such as polyethylene or polypropylene, or a method of forming communication holes by chemically treating or etching a film material. Among these forming methods, in the phase separation method, the volume ratio of the pores 15 in the thickness direction of the porous film can be increased. Furthermore, in the phase separation method, the strength of the porous film can be maintained even in a case where the volume ratio of the pores 15 in the thickness direction is increased. Accordingly, in a case where a pressure or the like is applied to the porous film, the pores 15 are hardly crushed, and as a result, the gas exchange efficiency associated with carbon dioxide and oxygen through the pores 15 is increased, and thus the effect of storing fruits and vegetables and raising seedlings can be stably maintained.

In FIG. 2, the pores 15e and 15f communicate with each other in a direction substantially along the film surface of the porous film 12, but in the five pores 15a, 15b, and 15e, 15f, and 15g including the two pores 15e and 15f, these penetrate the film in the thickness direction. The plurality of pores 15 may communicate with each other to penetrate the film from one film surface (hereinafter, referred to as a first porous surface) 12A on the outer side of the packaging bag 10 toward the other film surface (hereinafter, referred to as a second porous surface) 12B on the inner side of the packaging bag, and all communication directions of the pores 15 may not be in the thickness direction. In addition, in the plurality of pores 15 formed, there may be pores which do not communicate with other pores 15, that is, pores which are defined as one void.

Since the plurality of pores 15 formed to penetrate the film in the thickness direction have an average pore size of 0.0050 µm or greater, an excessive change in concentration of each gas in the packaging bag 10 is suppressed more reliably than in a case where the average pore size is less than 0.0050 µm. In addition, since the average pore size is 5.0 µm or less, the concentration of each gas is within a range more suitable for storage of fruits and vegetables or respiration of seedlings to be raised than in a case where the average pore size is greater than 5.0 µm. In addition, in a case where the average pore size is within a range of 0.0050 µm to 5.0 µm, intrusion of viruses (substantially having a size of 0.03 µm to 0.1 µm), bacteria (substantially having a size of 0.2 µm to 5 µm), and/or fungi (including mold) (substantially having a size of 5 µm to 12 µm) is suppressed. For example, in a case where the average pore size is 1.2 µm, intrusion of fungi is suppressed, in a case where the average pore size is 0.20 µm, intrusion of bacteria is suppressed, and in a case where the average pore size is 0.030 µm, intrusion of viruses is suppressed. As a result, the housed fruits and vegetables are stored with good freshness, and in a case where the packaging bag is used for raising seedlings, disease of the seedlings can be prevented. Furthermore, since the plurality of pores 15 having an average pore size within the above range are formed to communicate with each other in the thickness direction, intrusion of viruses, bacteria, and/or fungi is more reliably suppressed while controllability of each gas concentration is secured.

The material of the porous film 12 is not particularly limited as long as it is hydrophobic enough that the pores 15 are not blocked by the moisture released from the agricultural product. Examples thereof include polysulfone, polyethersulfone, polyethylene, polypropylene, polyvinylidene fluoride, polytetrafluoroethylene, and cellulose acylate, and in this example, polysulfone is used.

As the porous film 12, a commercially available product which is commercially available may be used. For example, a filter with an average pore size of 0.030 µm which is incorporated in micro filter ASTROPORE (registered trademark) PSS03 cartridge manufactured by FUJIFILM Corporation, a filter with an average pore size of 0.20 µm which is incorporated in a PSE cartridge, a filter with an average pore size of 1.2 µm which is incorporated in a PSE cartridge (the material of the above filters is polysulfone), a filter with an average pore size of 0.45 µm which is incorporated in a FL cartridge (the material is polytetrafluoroethylene), a filter with an average pore size of 4.5 µm which is incorporated in a PPE cartridge UXL (nonwoven fabric made of polypropylene), a filter with an average pore size of 0.65 µm which is incorporated in a VITIPORE (registered trademark) II cartridge manufactured by Merck KGaA (the material is polyvinylidene fluoride), a filter with an average pore size of 0.20 µm which is incorporated in a SUPOR (registered trademark) cartridge manufactured by Pall Corporation (the material is polyethersulfone), or the like can be used.

In the packaging bag 10, the CA film 11 preferably has an area ratio SR11 of at least 10.0% since condensation is more reliably suppressed. The area ratio SR11 is more preferably within a range of 10.0% to 99.9%, even more preferably within a range of 15.0% to 99.5%, and particularly preferably within a range of 25.0% to 99.2%.

In the packaging bag 10, the porous film 12 preferably has an area ratio SR12 of 0.1% to 20.0% from the viewpoint of controlling each gas concentration in the housing space. The area ratio SR12 is more preferably within a range of 0.3% to 15.0%, and even more preferably within a range of 0.5% to 10.0%.

Figure 3:
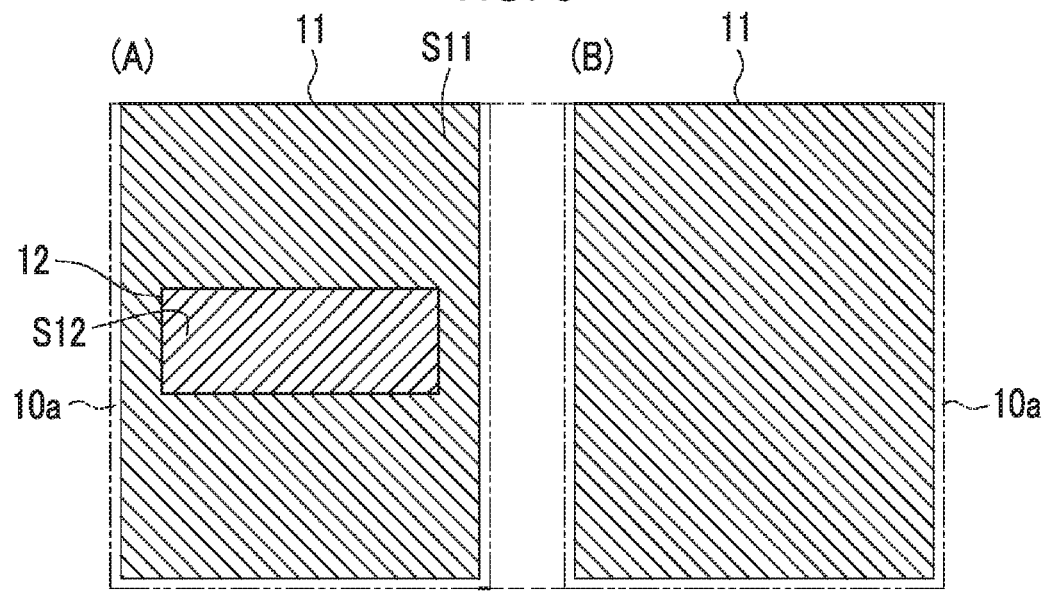
FIG. 3 is a view illustrating a method of obtaining an area ratio. (A) represents a first sheet, and (B) represents a second sheet.

The area ratios SR11 and SR12 are obtained by the following methods, respectively. In the packaging bag 10, a total surface area of a partition separating the internal housing space which houses fruits and vegetables from the external space is represented by SA, and as shown in FIG. 3, the area of the CA film 11 in the partition is represented by S11, and the area of the porous film 12 is represented by S12. Since the bonding portion 10a (see FIG. 1) does not function as a partition separating the housing space from the external space, the area of the bonding portion 10a is not included in any of the area S11 or the area S12. Therefore, in FIG. 3, the areas of references S11 and S12 are not hatched in the region of the bonding portion 10a indicated by the chain double-dashed line. In this example, there is an overlapping region in which the CA film 11 and the outer peripheral portion of the porous film 12 overlap as described above. In a case where there is an overlapping region between the two films, the overlapping region is excluded, that is, ignored to set the areas S11 and S12. That is, the area of only the CA film 11 is represented by S11, and the area of only the porous film 12 is represented by S12. In FIG. 3, the overlapping region between the CA film 11 and the porous film 12 is not drawn as in FIG. 1. The total surface area SA, the area S11, and the area S12 form the surface area inside (housing space side) the packaging bag 10, that is, the area of the inner surface. The area ratio SR11 (unit: %) is obtained by (S11/SA)×100. The area ratio SR12 (unit: %) is obtained by (S12/SA)×100. In this example, since the partition of the packaging bag 10 is formed only of the CA film 11 and the porous film 12, the total surface area SA is the sum of the areas S11 and S12 (S11+S12).

Figure 4:
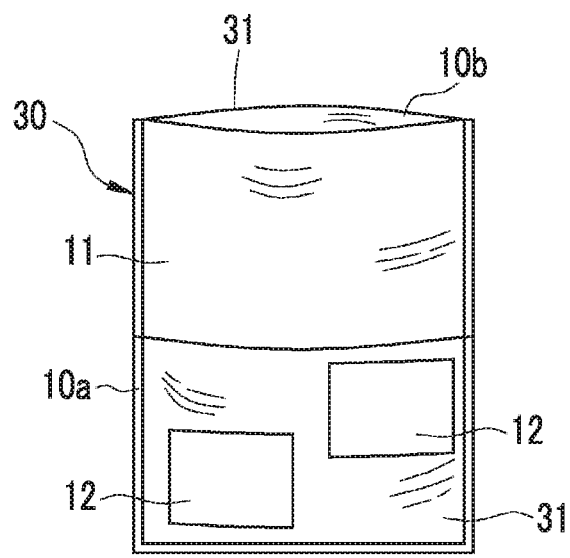
FIG. 4 is a view illustrating a packaging bag according to another embodiment.

The packaging bag may be provided with other films in addition to the CA film 11 and the porous film 12. A whole packaging bag 30 shown in FIG. 4 is formed of films as in the packaging bag 10, and is provided with a CA film 11, a porous film 12, and a polypropylene film (hereinafter, referred to as a PP film) 31. The PP film 31 is an example of a film different from both the CA film 11 and the porous film 12, and is formed of polypropylene. The PP film 31 has no pores 15 unlike the porous film 12. A first sheet is formed of a CA film 11, a porous film 12, and a PP film 31, and a second sheet is formed of a PP film 31. In FIG. 4, the front side is drawn as the first sheet, and the back side is drawn as the second sheet as in FIG. 1. At least one of the first sheet or the second sheet may be further provided with a film different from the PP film 31. The second sheet may be provided with at least one of the CA film 11 or the porous film 12. In FIG. 4, the same members as those in FIG. 1 are denoted by the same references as those in FIG. 1, and descriptions thereof will be omitted.

In the first sheet, the CA film 11 forms the upper region of FIG. 3, and the porous film 12 and the PP film 31 form the lower region. However, the region formed by the CA film 11, the region formed by the porous film 12 and the PP film 31, and their positional relationship are not limited to this example. The porous film 12 is disposed to be surrounded by the PP film 31. However, the positional relationship between the porous film 12 and the PP film 31 is not limited thereto. For example, the PP film 31 and the porous film 12 may be disposed such that the regions thereof are divided in any of the horizontal direction, the vertical direction, or the oblique direction in FIG. 3. In addition, the porous film 12 is disposed to be surrounded by the PP film 31, but is not limited to this aspect. For example, the porous film may be disposed to be surrounded by the CA film 11 on the upper side in FIG. 4. In this example, two porous films 12 are disposed, but three or more porous films may be disposed. Otherwise, one porous film may be disposed as in the packaging bag 10. The number of the porous films 12 is not particularly limited.

The PP film 31 is used as a film formed of a hydrophobic material which does not deform due to the moisture released from an agricultural product, and other films may be used as long as these are formed of a hydrophobic material. For example, a polyethylene film formed of polyethylene, a polyethylene terephthalate film formed of polyethylene terephthalate, or the like can be used.

The CA film 11 and the PP film 31 are bonded to overlap each other, and the porous film 12 and the PP film 31 are bonded to overlap each other in the first sheet. However, since the overlapping regions have a very small width, the overlapping regions are not shown in FIG. 4. The bonding between the CA film 11 and the PP film 31 and the bonding between the porous film 12 and the PP film 31 can be performed by, for example, heat sealing.

Figure 5:
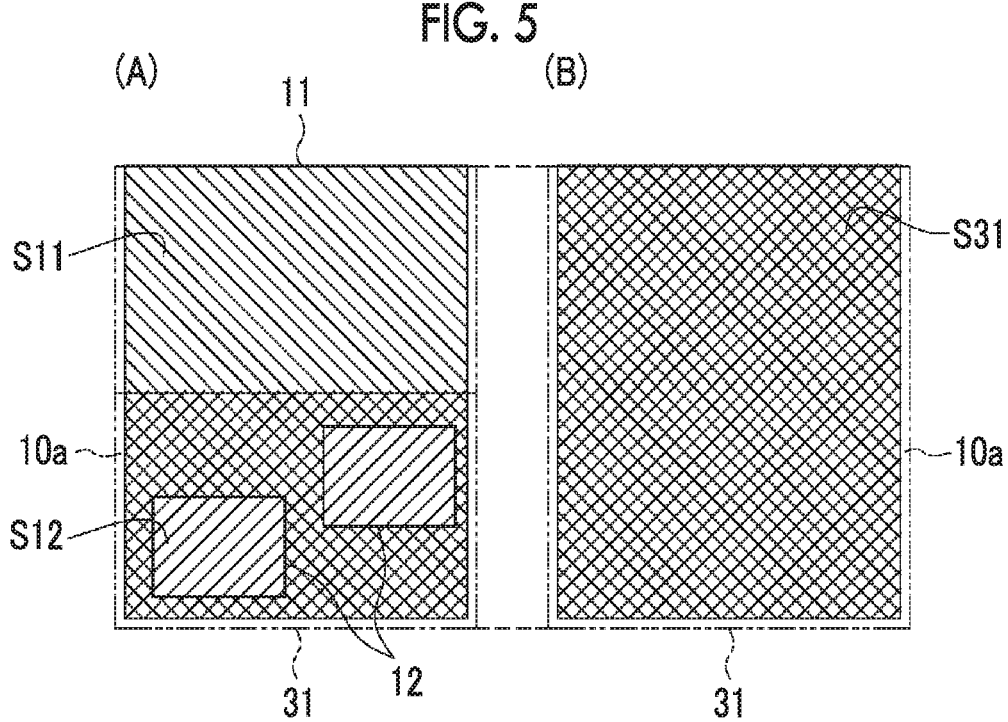
FIG. 5 is a view illustrating a method of obtaining an area ratio. (A) represents a first sheet, and (B) represents a second sheet.

In the packaging bag 30, preferable ranges of the area ratio of the CA film 11 and the area ratio of the porous film 12 are the same as those in the packaging bag 10. Here, as shown in FIG. 5, the area of the PP film 31 in the partition separating the housing space from the external space is represented by S31. The area S31 is shown by cross-hatching in FIG. 5 and forms the surface area on the housing space side as in the case of the total surface area SA, the area S11, and the area S12. In this example, the total surface area SA is S11+S12+S31, and is used in the above-described formulas for the area ratios SR11 and SR12, respectively. In a case where a film different from the CA film 11 and the porous film 12 is used, the area of the film may be included in the total surface area SA. Similarly to the packaging bag 10, the packaging bag 30 is not limited to the case where agricultural products are packaged, and can also be used in the agricultural production.

Figure 6:
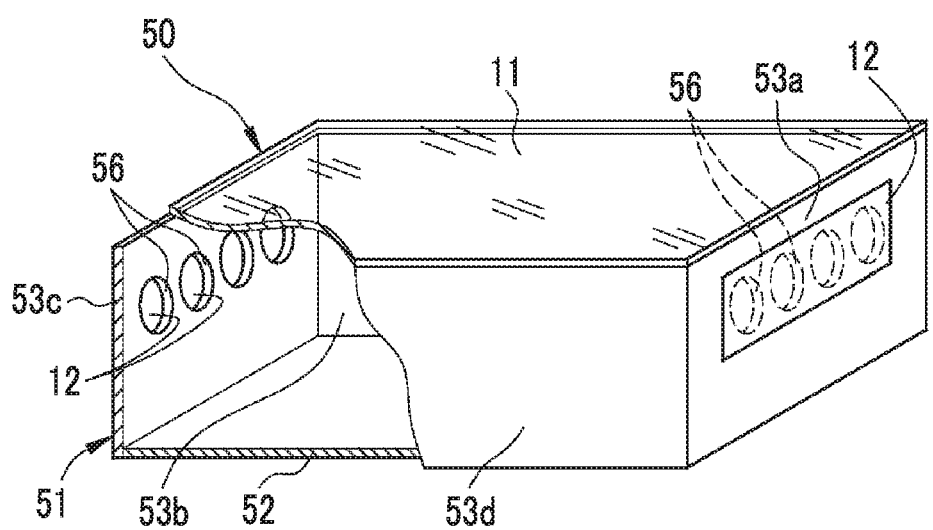
FIG. 6 is a schematic perspective view of a packaging box according to an embodiment of the present invention.

The shape of the agricultural container is not limited to a bag shape, and may be, for example, a box shape. The agricultural container may be provided with a member other than the films. Similarly to the packaging bags 10 and 30, a packaging box 50, which is an example of the agricultural container shown in FIG. 6, houses agricultural products. In this example, fruits and vegetables are housed as agricultural products, but the fruits and vegetables are not shown in FIG. 6. In FIG. 6, the same members as those in FIG. 1 are denoted by the same references as those in FIG. 1, and descriptions thereof will be omitted.

As shown in FIG. 6, the packaging box 50 is provided with a housing member 51 formed into a box shape with an open top, a CA film 11 disposed in a top surface, and a porous film 12 provided on the housing member 51. In FIG. 6, the thickness of the CA film 11 is drawn in an exaggerated manner with respect to the thickness of the housing member 51. The housing member 51 has a bottom plate 52 as a bottom surface portion, and four side plates 53a to 53d as side surface portions provided in an erect posture with respect to the bottom plate 52. Hereinafter, the side plates 53a to 53d are referred to as side plates 53 in a case where there is no need to distinguish them. The housing member 51 is formed of polypropylene, but the material of the housing member 51 is not particularly limited as long as the material is hydrophobic enough not to be deformed by moisture released from the agricultural product. As a material other than polypropylene, for example, polyethylene, polyethylene terephthalate, polystyrene, and the like can be used.

The bottom plate 52 has a rectangular shape. However, the shape of the bottom plate is not limited to the rectangle. The bottom plate 52 may have a rectangular shape such as a square, other than the rectangle, or a circular shape (a true circle or an ellipse), and its shape is not particularly limited. A plurality of openings 56 are formed in each of the side plates 53a and 53c disposed in a posture facing each other among the side plates 53a to 53d, and the porous film 12 is provided on the side plates 53a and 53c to cover the plurality of openings 56. Accordingly, for the openings 56, the porous film 12 functions as a partition separating the housing space which houses fruits and vegetables from the external space. In the packaging box 50, a part of the partition separating the housing space from the external space is formed of a film, and the whole partition may not be formed of a film as in the packaging bags 10 and 30. That is, at least a part of the packaging container may be formed of a film.

The openings 56 are formed in each of the side plates 53a and 53c. However, these may be formed in either one of the side plates. From the viewpoint of making the gas exchange of the housing space of the packaging box 50 more effective, it is more preferable to form the openings in both the side plates 53a and 53c facing each other. The openings 56 may be formed in the side plates 53b and 53d instead of being formed in the side plates 53a and 53c, or may be formed in at least three of the side plates 53a to 53d.

The positions of the openings 56 are on the upper side in the vertical direction in FIG. 6, but are not limited thereto. The positions may be on the lower side or at the center in the vertical direction in FIG. 6. In this example, the plurality of openings 56 are formed to be arranged in the inward direction. However, the openings may be formed to be arranged in the vertical direction, or may be irregularly disposed.

In this example, the porous film 12 is provided on the surface (outer surface) of each of the side plates 53a and 53c on the external space side, but may be provided on the surface on the housing space side. The opening 56 has a circular shape with a diameter of, for example, 8 mm. However, its shape is not particularly limited and may be a polygon, an irregular shape, a slit shape, or the like. The shape may be larger than that of the pore 15 of the porous film 12 so as not to impair the above-described actions of the porous film 12. The number of openings 56 in each of the side plates 53a and 53c is 4 in FIG. 6, but is not particularly limited. The number of openings may be one to three or five or more.

The CA film 11 is provided at the upper portion of the housing member 51 as a top surface portion of the packaging box 50. However, the CA film 11 may be provided as, for example, a side surface portion to replace a part of the housing member 51. For example, the CA film 11 may be provided on the side plate 53 to cover the openings 56. In that case, the porous film 12 may be provided as a part of the top surface portion. The CA film 11 and the porous film 12 may be located at any position in the packaging box 50 as long as these function as partitions separating the housing space from the external space. Therefore, a part of the CA film 11 of the top surface portion may be replaced with the porous film 12.

Figure 7:
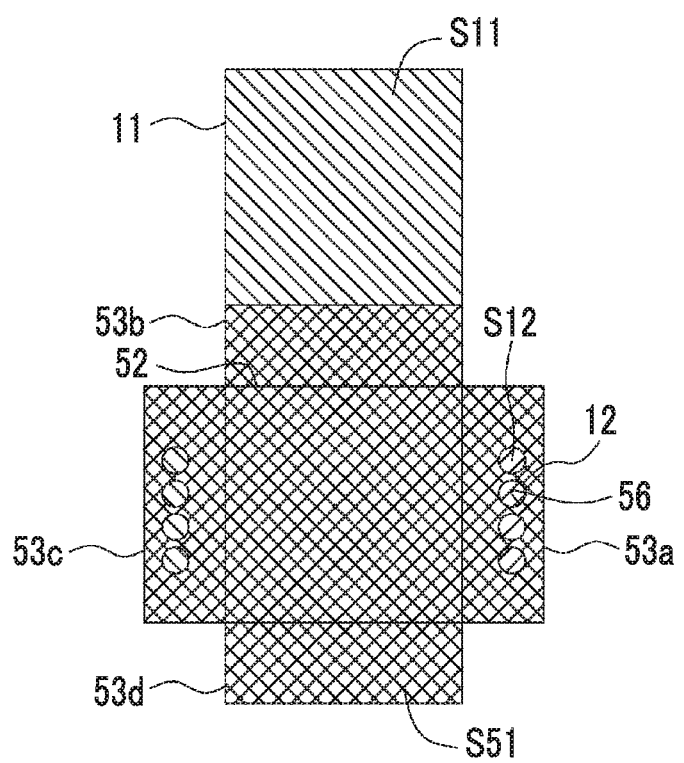
FIG. 7 is a development view illustrating a method of obtaining an area ratio.

In the packaging box 50, preferable ranges of the area ratio of the CA film 11 and the area ratio of the porous film 12 are the same as those in the packaging bag 10. Here, as shown in FIG. 7, the area of the housing member 51 in the partition separating the housing space from the external space is represented by S51. The area S51 is shown by cross-hatching in FIG. 7 and forms the surface area on the housing space side as in the case of the total surface area SA, the area S11, the area S12, and the area S31. In this example, the total surface area SA is S11+S12+S51, and is used in the above-described formulas for the area ratios SR11 and SR12, respectively. In a case where a film and/or member different from the CA film 11 and the porous film 12 is used, the area of the film and/or member may be included in the total surface area SA. Since the total surface area SA, the area S11, and the area S12 also form the surface area on the housing space side, that is, the area of the inner surface in this example, FIG. 7 is a development view of the inner surface side.

The packaging box 50 can be used not only for packaging agricultural products, but also for agricultural production, similarly to the packaging bags 10 and 30. For example, the packaging box can be used as a seedling raising box for growing seedlings, and in that case, the seedling is preferably grown to have a considered size after growth. A seedling raising apparatus 69 shown in FIG. 8 includes a seedling raising box 70 as an agricultural container and a light source unit 71.

Figure 8:
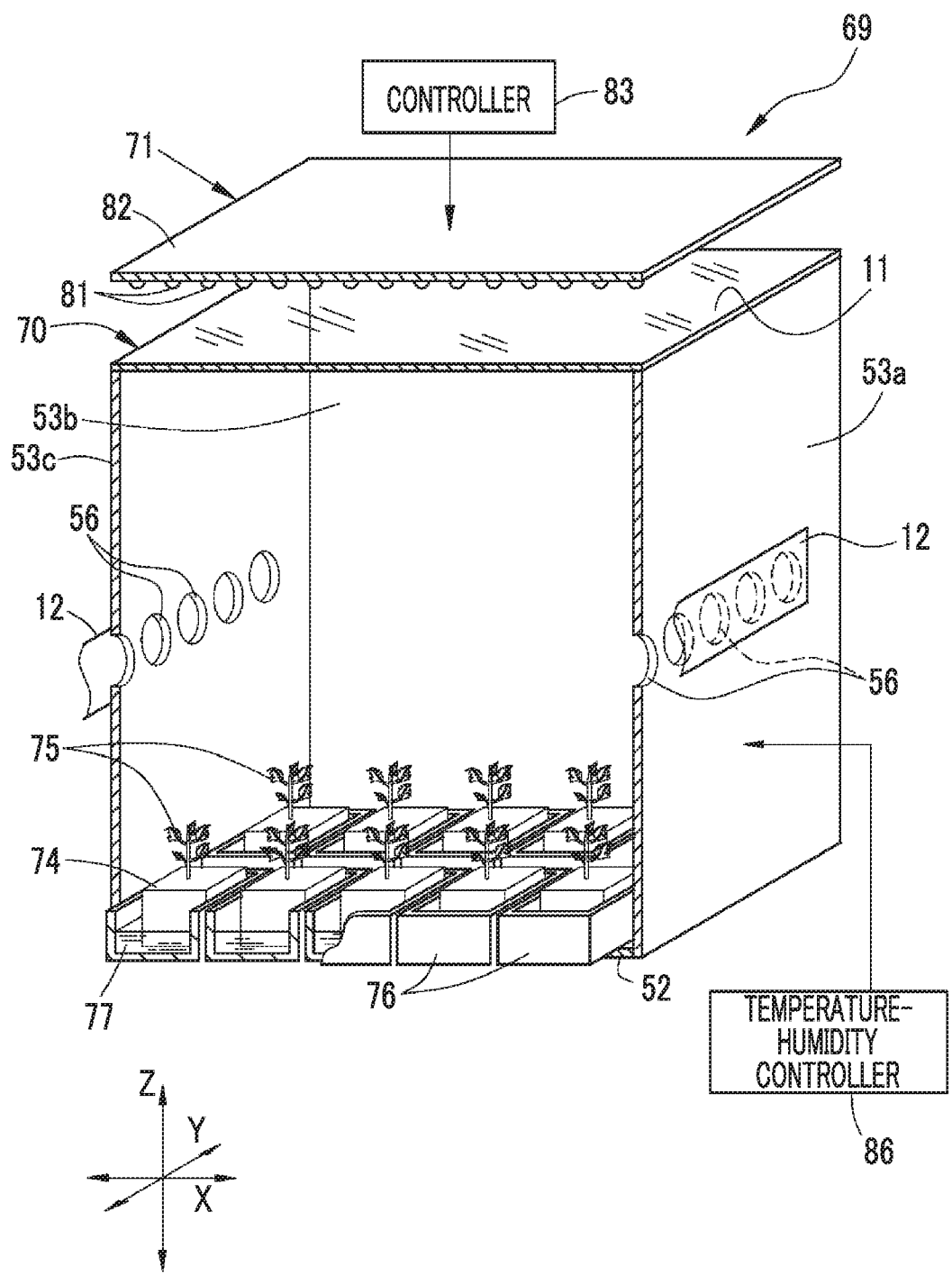
FIG. 8 is a schematic perspective view of a seedling raising apparatus according to an embodiment of the present invention.

The seedling raising box 70 is formed larger than the packaging box 50, and the position and the number of openings 56 and the size of the porous film 12 are different from those in the packaging box 50. Other configurations are the same as those in the packaging box 50. Descriptions of the same configurations and actions as those in the packaging box 50 will be omitted. In FIG. 8, the side plate 53*d* (see FIG. 6) on the front side is not shown. Beds 74 and seedlings 75 to be grown are provided as the object to be housed. The seedling 75 is smaller than a plug seedling. More specifically, the seedling has a height of 1 cm to 8 cm and/or has two to five leaves. The seedling 75 is an example of a seedling. Thus, seeds (not shown) may be used instead of the seedlings 75, and in a case where seeds are used, the seedling raising apparatus 69 performs germination and seedling growth (seedling raising).

In this example, the seedling 75 is a seedling of komatsuna, but is not limited to komatsuna. The seedling may be a seedling of leafy vegetables other than komatsuna or a seedling of fruit and vegetables. Examples of the fruits and vegetables include eggplant, bell pepper, paprika, cucumber, edamame, corn, tomato, and strawberry. Examples of other seedlings of leafy vegetables include seedlings of cabbage, lettuce, broccoli, celery, spinach, or perilla.

In this example, the number of seedlings 75 is more than one. However, the number of seedlings is not limited thereto and may be one. In addition, each of the plurality of seedlings 75 is planted in a different bed 74, but the number of seedlings 75 planted in one bed 74 is not particularly limited. The beds 74 are arranged in square in the horizontal direction, and the number of columns (the number of columns in the horizontal direction in FIG. 8) is five in this example. However, the arrangement is not limited to this example. The beds may be arranged in one to four columns, or in six or more columns. In the drawing, the column direction is denoted by the arrow X, the row direction perpendicular to the column direction X in the horizontal direction is denoted by the arrow Y, and the vertical direction is denoted by the arrow Z. In this embodiment, the number of rows of the beds 74 (the number of rows in the row direction Y) is, for example, 1, 2, or 10. The number of rows of the beds 74 is not limited to this example, and may be within a range of 3 to 9, or 11 or more.

The arrangement of the plurality of beds 74 in the horizontal direction is not limited to the square arrangement, and may be a regular arrangement other than the square arrangement or an irregular (random) arrangement. In this example, the plurality of beds 74 are arranged to be separated from each other with a slight gap therebetween. However, the beds 74 may be arranged in contact with each other.

In this example, containers 76 are further housed as an object to be housed. The container 76 has an open upper portion, and contains water 77 and the beds 74. Thus, at least a lower portion of the bed 74 is immersed in the water 77. Due to the immersion, water is supplied to the seedlings 75. A known material may be used as the bed 74, and examples thereof include soil, sponge, and fibrous materials. In this embodiment, rock wool is used as the bed 74, and specifically, rock wool Grodan (registered trademark) manufactured by Rockwool Corporation (Rockwool B. V., Netherlands) is used. The seedling raising apparatus 69 is an apparatus which grows the seedlings 75 by hydroponics, but the cultivation method by the seedling production apparatus is not limited to hydroponics. Examples of other cultivation methods include soil cultivation, nutrient solution cultivation, and elevated cultivation, and the beds 74 may be changed according to the cultivation method.

The light source unit 71 is provided to irradiate the beds 74 and/or the seedlings 75 with light. In the germination of seeds, the light source unit 71 is used to irradiate the beds 74 with light before germination. The light source unit 71 is provided with a plurality of light sources 81 which emit light, a support plate 82, and a controller 83. The light sources 81 and the support plate 82 are disposed above the seedling raising box 70. The support plate 82 is an example of a support member which supports the plurality of light sources 81. In this example, each light source 81 is provided on a lower surface which is a facing surface facing the seedling raising box 70. The controller 83 has a first function of adjusting the amount of light emitted from each of the plurality of light sources 81 and a second function of performing on/off control of each of the plurality of light sources 81. With the first function, the amount of light applied to the seedlings 75 or the beds 74 is adjusted. With the second function, the timing of light irradiation and the irradiation time are adjusted according to the type and/or the degree of growth of the seedlings 75. The light sources 81 irradiate the seedlings 75 or the beds 74 with light controlled by the controller 83. Accordingly, the seedlings 75 grow, and in a case where seeds are provided, the seeds germinate. In this example, the distance between the light source 81 and the seedling raising box 70 is about 100 mm, but is not limited to this example.

The seedling raising box 70 has a temperature-humidity controller 86. The temperature-humidity controller 86 adjusts the temperature and the humidity inside the seedling raising box 70 to adjust the growth environment of the seedlings 75. The temperature inside the seedling raising box 70 is not particularly limited, but preferably within a range of 10.0° C. to 40.0° C. In this example, the temperature is set to 20.0° C., and thus it is confirmed that the temperature is fluctuated within a range of 17.5° C. to 22.5° C. The humidity inside the seedling raising box 70 is not particularly limited, but preferably a relative humidity of 50.0% to 80.0%. In this example, the humidity is within a range of 40.5% to 91.0%.

The CA film 11 disposed in the top surface of the seedling raising box 70 is formed of cellulose acylate, and is thus transparent. Therefore, the light from the light sources 81 disposed above the seedling raising box 70 is effectively applied to the seedlings 75 and/or the beds 74, and further promotes the growth of the seedlings. The light sources 81 and the CA film 11 are preferably disposed in a positional relationship facing each other.

The seedling raising box 70 has such a height that the grown seedlings 75 can be housed in consideration of the height of the grown seedlings 75. The openings 56 are formed at the centers of the side plates 53*a* and 53*c* in the vertical direction Z. Since the porous film 12 is provided on the side plates 53 which form the side surfaces of the seedling raising box 70, the porous film 12 is provided in an erect posture with respect to the bed 74. Accordingly, in the space above the beds 74 in the housing space of the seedling raising box 70, gas exchange is more reliably performed by the porous film 12, and as a result, respiration of the seedlings 75 is more reliably controlled.

Hereinafter, examples of the present invention and comparative examples related to the present invention will be shown.

EXAMPLES

Example 1 to Example 9

Packaging boxes 50 were formed by adhering a CA film 11 to a housing member 51, and provided as Examples 1 to 9. An area S11 and an area of a bottom plate 52 on the housing space side had a size of 8 cm×17.5 cm (=140 cm$^2$), and the housing space of the packaging box 50 had a height of 5.5 cm. Openings 56 having a diameter of 8 mm were formed in side plates 53a and 53c by punching, and a porous film 12 was adhered to the side plates 53a and 53c to cover the openings 56. An area S12 was adjusted by the number of openings 56 to be formed.

The CA film 11 was manufactured to have a width of 1.5 m and a thickness of 40 μm by a solution film forming method, and a length of 2,000 m was wound by a winder 17. The composition of a dope is as follows. The following solid is a solid component which forms the CA film 11.

| | |
|---|---|
| First Component of Solid | 100 parts by mass |
| Second Component of Solid | 15 parts by mass |
| Third Component of Solid | 1.3 parts by mass |
| Dichloromethane (first component of solvent) | 635 parts by mass |
| Methanol (second component of solvent) | 125 parts by mass |

The first component of the solid was cellulose acylate, and all acyl groups of the cellulose acylate were acetyl groups. The viscosity average degree of polymerization was 320, and the acyl group substitution degree was 2.86.

The second component of the solid was a plasticizer, and the plasticizer used was an oligomer having an ester of an adipic acid and an ethylene glycol as a repeating unit (the molecular weight obtained by terminal functional group quantitation was 1,000). The third component of the solid was silica particles R972 manufactured by NIPPON AEROSIL CO., LTD.

The dope used in the solution film forming method was prepared by the following method. First, a first component and a second component of the solid, and the solvent which was a mixture of dichloromethane and methanol were put into a sealed container, and stirred in the sealed container in a state in which the temperature was maintained at 40° C. to dissolve the first component and the second component of the solid in the solvent. A third component of the solid was dispersed in a mixture of dichloromethane and methanol, and the obtained dispersion was put into and dispersed in the sealed container containing the solution in which the first component and the second component of the solid were dissolved. The dope obtained in this manner was left, and then filtered using filter paper in a state in which the temperature was maintained at 30° C. After that, the filtrate was subjected to a defoaming treatment, and then subjected to casting in the solution film forming apparatus. The filter paper used for filtering was production filter paper No. 63 manufactured by Advantec Toyo Kaisha, Ltd.

The dope at 30° C. was cast from a casting die to a long belt moved in a longitudinal direction, and a casting film was formed. A blowing machine applied air at 100° C. to the casting film immediately after the formation, and the dried casting film was peeled from the belt by a peeling roller. The temperature of the belt at a peeling position was 10° C. The casting film was peeled after 120 seconds after the formation of the casting film. The solvent content of the casting film at the peeling position was 100% by mass. Peeling was performed with a tension of 150 N/m. This tension is a force per 1 m width of the casting film. The formed CA film 11 was guided to a roller dryer, and dried while being handled in a state in which a tension was applied in the longitudinal direction by a plurality of rollers. The tension applied in the longitudinal direction was 100 N/m. This tension is a force per 1 m width of the CA film 11. The roller dryer had a first zone on the upstream side and a second zone on the downstream side. The temperature of the first zone was set to 80° C., and the temperature of the second zone was set to 120° C. The CA film 11 was handled for 5 minutes in the first zone, and handled for 10 minutes in the second zone. The solvent content of the CA film 11 wound by the winder was 0.3 mass %. The moisture permeability (40° C., 90% relative humidity) of the obtained CA film was 870 g/m$^2$·day. The moisture permeability was evaluated based on Japanese Industrial Standards JIS Z-0208.

Tables 1-1 to 1-3 show the total surface area SA, the volume V of the housing space, and conditions of the CA film 11 and the porous film 12 used. The meaning of the column of "Kind" of "Porous Film" in Table 1-3 and Tables 2-3 and 3-3 to be described below is as follows. Each of the porous films 12 represented by A to C is formed of polysulfone, and is produced using a phase separation method.

A: A filter with an average pore size of 0.030 μm which is incorporated in a micro filter ASTROPORE (registered trademark) PSS03 cartridge manufactured by FUJIFILM Corporation B: A filter with an average pore size of 0.20 μm which is incorporated in a 2 μm pore size product of a micro filter ASTROPORE (registered trademark) PSE cartridge manufactured by FUJIFILM Corporation C: A filter with an average pore size of 1.2 μm which is incorporated in a 1.2 μm pore size product of a micro filter ASTROPORE (registered trademark) PSE cartridge manufactured by FUJIFILM Corporation D: A filter with an average pore size of 0.65 μm which is incorporated in a VITIPORE (registered trademark) II cartridge manufactured by Merck KGaA E: A filter with an average pore size of 4.5 μm which is incorporated in an ASTROPORE (registered trademark) PPE cartridge UXL manufactured by FUJIFILM Corporation (polypropylene nonwoven fabric)

F: A filter with an average pore size of 0.20 μm which is incorporated in a SUPOR (registered trademark) cartridge manufactured by Pall Corporation (polyether sulfone)

TABLE 1-1

| | Packaging Box | |
|---|---|---|
| | Total Surface Area SA (cm$^2$) | Internal Volume V (cm$^3$) |
| Example 1 | 561 | 770 |
| Example 2 | 561 | 770 |
| Example 3 | 561 | 770 |
| Example 4 | 561 | 770 |
| Example 5 | 561 | 770 |
| Example 6 | 561 | 770 |
| Example 7 | 561 | 770 |
| Example 8 | 561 | 770 |
| Example 9 | 561 | 770 |

TABLE 1-1-continued

| | Packaging Box | |
|---|---|---|
| | Total Surface Area SA (cm²) | Internal Volume V (cm³) |
| Comparative Example 1 | 561 | 770 |
| Comparative Example 2 | 561 | 770 |
| Comparative Example 3 | 561 | 770 |

TABLE 1-2

| | CA Film | | |
|---|---|---|---|
| | Area S11 (cm²) | Area Ratio SR11 (%) | Thickness (μm) |
| Example 1 | 140 | 25 | 40 |
| Example 2 | 140 | 25 | 40 |
| Example 3 | 140 | 25 | 40 |
| Example 4 | 140 | 25 | 40 |
| Example 5 | 140 | 25 | 40 |
| Example 6 | 140 | 25 | 40 |
| Example 7 | 140 | 25 | 40 |
| Example 8 | 140 | 25 | 40 |
| Example 9 | 140 | 25 | 40 |
| Comparative Example 1 | 140 | 25 | 40 |
| Comparative Example 2 | — | — | 100 |
| Comparative Example 3 | — | — | 100 |

TABLE 1-3

| | Porous Film | | | |
|---|---|---|---|---|
| | Kind | Area S12 (cm²) | Area Ratio SR12 (%) | Average Pore Size (μm) |
| Example 1 | A | 4 | 0.7 | 0.030 |
| Example 2 | A | 8 | 1.4 | 0.030 |
| Example 3 | A | 16 | 2.9 | 0.030 |
| Example 4 | A | 48 | 8.6 | 0.030 |
| Example 5 | B | 8 | 1.4 | 0.20 |
| Example 6 | C | 8 | 1.4 | 1.2 |
| Example 7 | D | 8 | 1.4 | 0.65 |
| Example 8 | E | 8 | 1.4 | 4.5 |
| Example 9 | F | 8 | 1.4 | 0.20 |
| Comparative Example 1 | — | — | — | — |
| Comparative Example 2 | — | — | — | — |
| Comparative Example 3 | A | 8 | 1.4 | 0.030 |

TABLE 1-4

| | Evaluation Results | | |
|---|---|---|---|
| | Condensation | Carbon Dioxide Concentration (ppm) | Bacteria |
| Example 1 | A | 4700 | A |
| Example 2 | A | 3300 | A |
| Example 3 | A | 2400 | A |
| Example 4 | A | 1200 | A |
| Example 5 | A | 2500 | A |
| Example 6 | A | 1900 | A |
| Example 7 | A | 2200 | A |
| Example 8 | A | 800 | B |
| Example 9 | A | 3100 | A |
| Comparative Example 1 | C | 80000 | C |
| Comparative Example 2 | B | 900 | C |
| Comparative Example 3 | C | 6500 | A |

The obtained packaging boxes 50 were subjected to sealing packaging for baby leaves to evaluate condensation, a carbon dioxide concentration as a gas concentration, and bacteria. The packaging boxes 50 sealed with 20 g of baby leaves contained therein were left at room temperature (21° C. to 24° C.) for 5 days. The method and criteria for each evaluation are as follows. The evaluation results are shown in Table 1-4.

1. Condensation

After the leaving for 5 days, the degree of condensation in the packaging box 50 was visually observed. The evaluation criteria are as follows. A and B are acceptable levels, and C represents an unacceptable level. The evaluation results are shown in the column "Condensation" in Table 1-4.

A: Condensation is not confirmed.

B: Condensation is not confirmed, but slight fogging occurs.

C: Water droplets are confirmed.

2. Gas Concentration

A carbon dioxide-temperature-humidity data logger ONDOTORI (registered trademark) TR-76Ui manufactured by T&D Corporation was provided on the side plate 53d inside the packaging box 50, and the carbon dioxide concentration was measured. The carbon dioxide concentration is a volume ratio of carbon dioxide to whole air. The carbon dioxide concentration shown in Table 1-4 is a value at the time when the carbon dioxide concentration became constant.

3. Bacteria

After the leaving for 5 days, a test for general viable bacteria was performed as a bacteria test at the CENTER FOR MICROBIOLOGICAL FOOD TESTING. The evaluation criteria are as follows. A and B are acceptable levels, and C represents an unacceptable level. The evaluation results are shown in the column of "Bacteria" in Table 1-4.

A: Less than 1,000 as the number of general viable bacteria.

B: 1,000 to less than 10,000 as the number of general viable bacteria.

C: 10,000 or more of general viable bacteria.

Comparative Example 1 to Comparative Example 3

In Comparative Example 1, baby leaves were stored in a state in which the openings 56 of the side plates 53a and 53c were blocked by a polypropylene plate without the use of the porous film 12 of Example 2. In Comparative Example 2, baby leaves were stored in a state in which a polyethylene terephthalate film was used instead of the CA film 11 of Example 2, and the openings 56 were blocked by a polypropylene plate without the use of the porous film 12. The polyethylene terephthalate film of Comparative Example 2 was a film in which about 20 perforations having a diameter of 300 μm were formed per 1 cm² area in the whole area, and had a thickness of 100 μm. In Comparative Example 3, a polyethylene terephthalate film was used instead of the CA film 11 of Example 2. The polyethylene terephthalate film of Comparative Example 3 did not have the above-described perforations, and had a thickness of 100 μm. Other conditions of the comparative examples are the same as in Example 2. The thickness of the polyethylene terephthalate film used is described in the column of "Thickness" of "CA Film" in Table 1-2.

The obtained packaging boxes were subjected to sealing packaging for baby leaves as in Examples 1 to 9 to evaluate condensation, a carbon dioxide concentration as a gas concentration, and bacteria. The evaluation results are shown in Table 1-4.

Example 10 to Example 21

Packaging boxes 50 were formed and set as Examples 10 to 18. A packaging bag 10 was formed and set as Example 19. Packaging bags 30 were formed and set as Examples 20 and 21. In the column of "Agricultural Container" in Table 2-1, "box" is described for the packaging box 50, and "bag" is described for each of the packaging bags 10 and 30.

The CA film 11 was formed in the same manner as in Examples 1 to 9. In the cellulose acylate used, all acyl groups were acetyl groups, and the acyl group substitution degree is shown in Table 2-2. Table 2-2 also shows conditions of the CA film 11 formed, such as a thickness, and conditions of the porous film. The moisture permeability (unit: g/m²·day) of the CA film in Table 2-2 is a value at 40° C. and 90% relative humidity.

Each of the obtained packaging box 50, packaging bag 10, and packaging bag 30 was subjected to sealing packaging for broccoli to evaluate condensation and a carbon dioxide concentration as a gas concentration in the same manner and according to the same criteria as in Examples 1 to 6. The reduction in weight of broccoli as drying, discoloration of broccoli, and deformation and wrinkles of the agricultural container were also evaluated. In each evaluation, 200 g of broccoli was packaged by sealing packaging. The agricultural container sealed with broccoli contained therein was left in a refrigerator set at 5° C. for 14 days. During 14 days, the temperature in the refrigerator changed within a range of 5° C. to 7° C., and the relative humidity changed within a range of 23% RH to 74% RH. The method and criteria for each evaluation are as follows. The evaluation results are shown in Table 2-4.

4. Reduction in Weight of Broccoli

The mass of the broccoli after the leaving under refrigeration was measured. The measured value is represented by MB (unit: g). Based on the mass (200 g) of broccoli before packaging by the agricultural container, the ratio of the reduced mass was calculated as a percentage by the formula of $\{(200-MB)/200\} \times 100$. The obtained results are shown in the column of "Reduction in Weight" in Table 2-4.

5. Discoloration of Broccoli

The degree of discoloration was evaluated by visually observing flower buds and a stem cut of the broccoli after the leaving under refrigeration. The evaluation criteria are as follows. A and B are acceptable levels, and C represents an unacceptable level. The evaluation results are shown in the column of "Discoloration" in Table 2-4.

A: The color has not changed since packaging.

B: Slight discoloration is confirmed. However, the flower buds are only slightly yellowish, and the stem cut is also only slightly discolored.

C: The flower buds are yellowish, and the stem cut is brown.

6. Deformation and Wrinkles of Agricultural Container

After the leaving under refrigeration for 14 days, the agricultural container was taken out of the refrigerator, and deformation and wrinkles appearing as the deformation progressed in the agricultural container were evaluated according to the following criteria. Regarding the deformation, the box 50 was evaluated for sagging and overall deformation of the CA film 11 disposed in the top surface, and the bags 10 and 30 were evaluated for deformation of the CA film 11 itself and the bonding portion 10a thereof. Regarding the wrinkles, deformation occurring in a portion where the CA film 11 was in contact with fruits and vegetables in the box 50 and the bags 10 and 30 was evaluated. 5, 4, and 3 represent acceptable levels, and 2 and 1 represent unacceptable levels. The evaluation results are shown in the column of "Deformation and Wrinkles" in Table 2-4.

5: No deformation is confirmed in the agricultural container.

4: Slight deformation and/or wrinkles are confirmed in a part of the agricultural container.

3: Deformation and wrinkles are confirmed in a part of the agricultural container, but there is no problem in practical use.

2: Deformation and wrinkles are confirmed in the whole agricultural container.

1: Severe deformation and wrinkles are both confirmed in the whole agricultural container.

TABLE 2-1

| | Agricultural Container | | |
|---|---|---|---|
| | Kind | Total Surface Area SA (cm²) | Internal Volume V (cm³) |
| Example 10 | box | 930 | 1800 |
| Example 11 | box | 930 | 1800 |
| Example 12 | box | 930 | 1800 |
| Example 13 | box | 930 | 1800 |
| Example 14 | box | 930 | 1800 |
| Example 15 | box | 930 | 1800 |
| Example 16 | box | 930 | 1800 |
| Example 17 | box | 930 | 1800 |
| Example 18 | box | 930 | 1800 |
| Example 19 | bag | 1320 | 1500 |
| Example 20 | bag | 1320 | 1500 |
| Example 21 | bag | 1320 | 1500 |
| Comparative Example 4 | box | 930 | 1800 |
| Comparative Example 5 | box | 930 | 1800 |
| Comparative Example 6 | box | 930 | 1800 |
| Comparative Example 7 | — | — | — |
| Comparative Example 8 | — | — | — |
| Comparative Example 9 | — | — | — |

TABLE 2-2

| | CA Film | | | | |
|---|---|---|---|---|---|
| | Acyl Group Substitution Degree | Area S11 (cm$^2$) | Area Ratio SR11 (%) | Thickness (μm) | Moisture Permeability (g/m$^2$·day) |
| Example 10 | 2.86 | 225 | 24 | 40 | 870 |
| Example 11 | 2.86 | 225 | 24 | 110 | 340 |
| Example 12 | 2.86 | 225 | 24 | 220 | 170 |
| Example 13 | 2.40 | 225 | 24 | 40 | 1020 |
| Example 14 | 2.00 | 225 | 24 | 40 | 1100 |
| Example 15 | 2.97 | 225 | 24 | 40 | 750 |
| Example 16 | 2.86 | 150 | 16 | 40 | 870 |
| Example 17 | 2.86 | 150 | 16 | 110 | 340 |
| Example 18 | 2.86 | 90 | 10 | 40 | 870 |
| Example 19 | 2.86 | 1300 | 98 | 40 | 870 |
| Example 20 | 2.86 | 660 | 50 | 40 | 870 |
| Example 21 | 2.86 | 330 | 25 | 40 | 870 |
| Comparative Example 4 | 2.86 | 90 | 10 | 40 | 870 |
| Comparative Example 5 | 1.00 | 225 | 24 | 40 | 1700 |
| Comparative Example 6 | — | 225 | 24 | 40 | 4030 |
| Comparative Example 7 | — | — | — | 40 | 10 |
| Comparative Example 8 | — | — | — | 25 | 0 |
| Comparative Example 9 | — | — | — | — | — |

TABLE 2-3

| | Porous Film | | | |
|---|---|---|---|---|
| | Kind | Area S12 (cm$^2$) | Area Ratio SR12 (%) | Average Pore Size (μm) |
| Example 10 | A | 15 | 1.6 | 0.030 |
| Example 11 | A | 15 | 1.6 | 0.030 |
| Example 12 | A | 15 | 1.6 | 0.030 |
| Example 13 | A | 15 | 1.6 | 0.030 |
| Example 14 | A | 15 | 1.6 | 0.030 |
| Example 15 | A | 15 | 1.6 | 0.030 |
| Example 16 | A | 15 | 1.6 | 0.030 |
| Example 17 | A | 15 | 1.6 | 0.030 |
| Example 18 | A | 15 | 1.6 | 0.030 |
| Example 19 | A | 20 | 1.5 | 0.030 |
| Example 20 | A | 20 | 1.5 | 0.030 |
| Example 21 | A | 20 | 1.5 | 0.030 |
| Comparative Example 4 | — | — | — | — |
| Comparative Example 5 | A | 15 | 1.6 | 0.030 |
| Comparative Example 6 | A | 15 | 1.6 | 0.030 |
| Comparative Example 7 | — | — | — | — |
| Comparative Example 8 | — | — | — | — |
| Comparative Example 9 | — | — | — | — |

TABLE 2-4

| | Evaluation Results | | | | |
|---|---|---|---|---|---|
| | Condensation | Carbon Dioxide Concentration (ppm) | Reduction in Weight (%) | Discoloration | Deformation and Wrinkles |
| Example 10 | A | 1200 | 9 | A | 5 |
| Example 11 | A | 2500 | 4 | A | 5 |
| Example 12 | B | 4000 | 2 | A | 5 |
| Example 13 | A | 1500 | 12 | A | 4 |
| Example 14 | A | 1800 | 14 | A | 3 |
| Example 15 | A | 1000 | 7 | A | 5 |
| Example 16 | A | 1800 | 7 | A | 5 |
| Example 17 | B | 3100 | 3 | A | 5 |
| Example 18 | B | 2300 | 3 | A | 5 |
| Example 19 | A | 800 | 30 | A | 5 |
| Example 20 | A | 1000 | 16 | A | 5 |
| Example 21 | A | 1300 | 8 | A | 5 |
| Comparative Example 4 | B | 50000 | 2 | C | 5 |
| Comparative Example 5 | A | 1900 | 18 | B | 2 |
| Comparative Example 6 | A | 2000 | 35 | B | 1 |
| Comparative Example 7 | C | 1600 | 0.3 | B | 5 |
| Comparative Example 8 | B | 70000 | 0.1 | C | 5 |
| Comparative Example 9 | — | — | 70 | B | — |

Comparative Example 4 to Comparative Example 9

In Comparative Example 4, a packaging box was formed in which the openings 56 of the side plates 53a and 53c were open without the use of the porous film 12, and other conditions were the same as those in Example 18. In Comparative Example 5, the CA film 11 of Example 10 was replaced with a CA film formed of cellulose acylate having an acyl group substitution degree of 1.00. In Comparative Example 6, the CA film 11 of Example 10 was replaced with ordinary cellophane PL #500 manufactured by FUTAMURA CHEMICAL CO., LTD. In Comparative Example 7, P-PLUS (registered trademark) (with zipper, size: M, 295 mm×220 mm, thickness: 40 μm) manufactured by Sumitomo Bakelite Co., Ltd. was used as the agricultural container. In Comparative Example 8, an F & G (registered trademark) anti-fog film No. 11 (size: 200 mm×300 mm, thickness: 25 μm) manufactured by Toyobo Co., Ltd. was used. In Comparative Example 8, a bag containing broccoli was left in a refrigerator in a state in which one side of the bag was sealed with an adhesive tape. In Comparative Example 9, unpacked broccoli was refrigerated (unpackaged state) without the use of the agricultural container. Other conditions are the same as those in Examples 10 to 21. The thicknesses of the materials used in Comparative Examples 4 to 8 are shown in the column of "Thickness" of the CA film in Table 2-2.

After the refrigerated storage for 14 days, condensation, a carbon dioxide concentration, the reduction in weight of broccoli, discoloration of broccoli, and deformation and wrinkles of the agricultural container were evaluated in the same manner as in Examples 10 to 21. Since the agricultural container was not used in Comparative Example 9, condensation and deformation and wrinkles of the agricultural container were not evaluated. The evaluation results are shown in Table 2-4.

Example 22 to Example 30

Seedlings of komatsuna were grown by the seedling raising apparatus 69. The size of the seedling raising box 70 on the housing space side was 20 cm×20 cm×20 cm. Other conditions of the seedling raising box 70 and the number of grown seedlings are shown in Table 3-1. The mass per one grown komatsuna was about 10 g, and the leaf area per one komatsuna was 30 cm². The moisture permeability (unit: g/m²·day) of the CA film in Table 3-2 is a value at 40° C. and 90% relative humidity.

Condensation and a carbon dioxide concentration as a gas concentration were evaluated. The evaluation methods and criteria are the same as those in Examples 1 to 9. However, the carbon dioxide concentration was measured by a carbon dioxide-temperature-humidity data logger ONDOTORI (registered trademark) TR-76Ui manufactured by T&D Corporation provided on the side plate 53b inside the packaging box 50. The carbon dioxide concentration is a volume ratio of carbon dioxide to whole air. The carbon dioxide concentration is obtained both during light irradiation by the light sources 81 and during turning-off of light (OFF). The results are shown in the column of "Irradiated" and in the column of "Unirradiated" in Table 3-4. The growth of the seedlings was also evaluated. The method and criteria for evaluation of seedling growth are as follows.

7. Seedling Growth

A sponge-urethane medium for hydroponics was used as the bed 74, and water was contained therein. Seeds of komatsuna were placed in the beds 74 and cultivated for 4 days at room temperature (21° C. to 24° C.). Thereafter, the obtained seedlings were put into the seedling raising box 70 together with the beds 74, and the growth of the seedlings 75 was evaluated after two days. Comparison of the size of the seedling 75 to that before putting of the seedling into the seedling raising box 70, and the size and the state of the leaves were evaluated as follows. A and B are acceptable levels, and C represents an unacceptable level.

A: The seedlings had the same size as before putting them into the seedling raising box. The leaves were wide without wilting.

B: The seedlings had the same size as before putting them into the seedling raising box. The leaves were wide and slightly wilted.

C: The seedlings had a smaller size than before putting them into the seedling raising box. The leaves were small and wilted.

TABLE 3-1

| | Seedling Raising Box | | |
|---|---|---|---|
| | Total Surface Area SA (cm²) | Internal Volume V (cm³) | Number of Seedlings (number) |
| Example 22 | 2400 | 8000 | 5 |
| Example 23 | 2400 | 8000 | 5 |
| Example 24 | 2400 | 8000 | 5 |
| Example 25 | 2400 | 8000 | 5 |
| Example 26 | 2400 | 8000 | 5 |
| Example 27 | 2400 | 8000 | 5 |
| Example 28 | 2400 | 8000 | 10 |
| Example 29 | 2400 | 8000 | 20 |
| Example 30 | 2400 | 8000 | 20 |
| Comparative Example 10 | 2400 | 8000 | 5 |

TABLE 3-2

| | CA Film | | | |
|---|---|---|---|---|
| | Area S11 (cm²) | Area Ratio SR11 (%) | Thickness (μm) | Moisture Permeability (g/m²·day) |
| Example 22 | 400 | 17 | 40 | 870 |
| Example 23 | 400 | 17 | 40 | 870 |
| Example 24 | 400 | 17 | 40 | 870 |
| Example 25 | 400 | 17 | 40 | 870 |
| Example 26 | 400 | 17 | 40 | 870 |
| Example 27 | 400 | 17 | 40 | 870 |
| Example 28 | 400 | 17 | 40 | 870 |
| Example 29 | 400 | 17 | 40 | 870 |
| Example 30 | 400 | 17 | 40 | 870 |
| Comparative Example 10 | 400 | 17 | 40 | 870 |

TABLE 3-3

| | Porous Film | | | |
|---|---|---|---|---|
| | Kind | Area S12 (cm²) | Area Ratio SR12 (%) | Average Pore Size (μm) |
| Example 22 | A | 3 | 0.1 | 0.030 |
| Example 23 | A | 5 | 0.2 | 0.030 |
| Example 24 | A | 12 | 0.5 | 0.030 |
| Example 25 | A | 20 | 0.8 | 0.030 |
| Example 26 | A | 60 | 2.5 | 0.030 |
| Example 27 | A | 100 | 4.2 | 0.030 |

TABLE 3-3-continued

| | | Porous Film | | |
| --- | --- | --- | --- | --- |
| | Kind | Area S12 (cm$^2$) | Area Ratio SR12 (%) | Average Pore Size (μm) |
| Example 28 | A | 100 | 4.2 | 0.030 |
| Example 29 | A | 100 | 4.2 | 0.030 |
| Example 30 | A | 20 | 0.8 | 0.030 |
| Comparative Example 10 | — | — | — | — |

TABLE 3-4

| | Evaluation Results | | | |
| --- | --- | --- | --- | --- |
| | | Carbon Dioxide Concentration | | |
| | Condensation | Irradiated (ppm) | Unirradiated (ppm) | Growth of Seedlings |
| Example 22 | A | 200 | 1300 | B |
| Example 23 | A | 220 | 1200 | B |
| Example 24 | A | 250 | 1000 | A |
| Example 25 | A | 300 | 800 | A |
| Example 26 | A | 350 | 600 | A |
| Example 27 | A | 400 | 550 | A |
| Example 28 | A | 380 | 700 | A |
| Example 29 | A | 380 | 800 | A |
| Example 30 | A | 330 | 1300 | A |
| Comparative Example 10 | A | 100 | 2000 | C |

Comparative Example 10

In Comparative Example 10, a packaging box was formed in which the openings 56 of the side plates 53a and 53c were blocked by a polypropylene plate without the use of the porous film 12, and other conditions were the same as those in Example 22.

Condensation, a carbon dioxide concentration, and seedling growth were evaluated in the same manner as in Examples 22 to 30. The evaluation results are shown in Table 3-4.

EXPLANATION OF REFERENCES 10, 30: packaging bag
10a: bonding portion
10b: opening
11: CA film
12: porous film
15,15a to 15h: pore
31: PP film
50: packaging box
51: housing member
52: bottom plate
53, 53a to 53d: side plate
56: opening
69: seedling raising apparatus
70: seedling raising box
71: light source unit
74: bed
75: seedling
76: container
77: water
81: light source
82: support plate
83: controller
86: temperature-humidity controller
S11: area of CA film
S12: area of porous film
S31: area of PP film
S51: area of housing member
SA: total surface area of partition
SR11: area ratio of CA film
SR12: area ratio of porous film

What is claimed is:

1. An agricultural container with a film which forms at least a part of a partition separating a housing space which houses an object to be housed from an external space, comprising:
   a cellulose acylate film containing cellulose acylate having an acyl group substitution degree of 2.00 to 2.97; and
   a porous film in which a plurality of pores having an average pore size of 0.0050 μm to 5.0 μm are formed to penetrate the film in a thickness direction,
   wherein the porous film is bonded to the cellulose acylate film.

2. The agricultural container according to claim 1, wherein the cellulose acylate has an acetyl group.

3. The agricultural container according to claim 1, wherein an area ratio of the cellulose acylate film is at least 10.0%.

4. The agricultural container according to claim 1, wherein an area ratio of the porous film is within a range of 0.1% to 20.0%.

5. The agricultural container according to claim 1, wherein in the porous film, the plurality of pores communicate with each other in the thickness direction.

6. The agricultural container according to claim 1, wherein the object to be housed is a bed and a seedling, and
   the porous film is disposed on a side surface in an erect posture with respect to the bed.

7. The agricultural container according to claim 6, wherein the porous film is disposed on each of a first and a second side surface facing each other.

8. The agricultural container according to claim 6, wherein the cellulose acylate film is disposed in a top surface.

9. The agricultural container according to claim 1, which is a bag having an opening through which the object to be housed is put into the bag.

* * * * *